United States Patent
Zhang et al.

(10) Patent No.: US 8,681,771 B2
(45) Date of Patent: Mar. 25, 2014

(54) UPLINK SYNCHRONOUS CONTROL METHOD AND APPARATUS OF THE HIGH SPEED SHARED INFORMATION CHANNEL

(75) Inventors: Yincheng Zhang, Shenzhen (CN); Zijiang Ma, Shenzhen (CN); Zhifeng Ma, Shenzhen (CN); Xuejun Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1633 days.

(21) Appl. No.: 12/090,796

(22) PCT Filed: Oct. 30, 2006

(86) PCT No.: PCT/CN2006/002905
§ 371 (c)(1),
(2), (4) Date: Jun. 4, 2008

(87) PCT Pub. No.: WO2007/051405
PCT Pub. Date: May 10, 2007

(65) Prior Publication Data
US 2008/0291878 A1    Nov. 27, 2008

(30) Foreign Application Priority Data
Nov. 3, 2005    (CN) .......................... 2005 1 0115456

(51) Int. Cl.
*H04J 3/06*    (2006.01)
*H04B 7/212*    (2006.01)

(52) U.S. Cl.
USPC ........................... 370/350; 370/324; 370/503

(58) Field of Classification Search
USPC ........................................................ 370/350
See application file for complete search history.

(56) References Cited

U.S. PATENT DOCUMENTS

| | | | | |
|---|---|---|---|---|
| 2003/0153323 A1* | 8/2003 | Hwang | .......................... | 455/450 |
| 2008/0089285 A1* | 4/2008 | Pirskanen et al. | ............ | 370/329 |

* cited by examiner

*Primary Examiner* — Shripal Khajuria
(74) *Attorney, Agent, or Firm* — IPSG, P.C. Intellectual Property Law

(57) ABSTRACT

The present invention discloses an uplink synchronization control method and system for the high speed shared information channel. The method includes: S102, a radio network controller assigns resources associated with the high speed downlink packet access for a user equipment and sends the information associated with the resources to Node B and the user equipment; S104, Node B configures uplink synchronization parameters for the high speed shared information channel for the user equipment using the uplink synchronization parameters which are assigned by the radio network controller for the radio link for the high speed shared information channel; the user equipment configures the uplink synchronization parameters for the high speed shared information channel of the user equipment using the uplink synchronization parameters for the uplink associated dedicated physical channel assigned by the radio network controller; S106, Node B and the user equipment send and/or receive a synchronization control commands and control the uplink synchronization process for the high speed shared information channel according to the uplink synchronization parameters for the high speed shared information channel assigned for the user equipment respectively.

11 Claims, 6 Drawing Sheets

UPLINK SYNCHRONOUS CONTROL METHOD AND APPARATUS OF THE HIGH SPEED SHARED INFORMATION CHANNEL

PRIORITY CLAIM

This application is related to and claims priority to a commonly assigned International PCT Application, Serial No. PCT/CN2006/002905, filed Oct. 30, 2006, which is incorporated by reference herein.

FIELD OF INVENTION

The present invention relates to communication field, more particularly to an uplink synchronous control method and system for the high speed shared information channel.

BACKGROUND OF THE INVENTION

One important feature of the third generation mobile communication system is the imbalance of the amount of the services on uplink and downlink, i.e., the amount of the services on the downlink is generally more than that on the downlink uplink. Therefore, 3rd Generation Partnership Project (3GPP for short) has induced the characteristics of High Speed Downlink Packet Access (HSDPA for short) into 3G standard. In the HSDPA characteristics, by inducing Adaptive Modulation and Coding (AMC for short), Hybrid Automatic Retransmission Request (HARQ) techniques and related techniques of reducing the time delay of network processes, provide downlink packet service with higher speed to improve the frequency efficiency.

A transport channel—High Speed Downlink Shared Channel (HS-DSCH for short) has been newly induced into the HSDPA technique, the HS-DSCH transport channel newly induced is mapped to the newly induced High Speed Physical Downlink Shared Channel (HS-PDSCH for short). Multiple users in a cell share the HS-PDSCH channel in manner of time division or code division. The Transport Time Interval (TTI for short) of HS-DSCH is 5 ms, the granularity of assigning time of HS-PDSCH channel is also 5 ms.

A MAC-hs sub-layer is newly induced into HSDPA technique. On network side, the MAC-hs is realized in Node B. each cell has one MAC-hs entity in Node B, the MAC-hs entity not only accomplish HS-DSCH data process and scheduling of each User equipment (UE for short) but also take charge of the management and assignment of the HSDPA physical resources of the cell thereof. In the HSDPA protocol criterion of the current 3GPP TD-SCDMA standard, two physical channels are newly induced into the physical layer of the system: the High Speed Shared Control Channel for HS-DSCHs (HS-SCCH for short) and High Speed Shared Information Channel for HS-DSCH (HS-SICH for short). One HS-SCCH and one HS-SICH are fixedly configured into one pair, HS-SCCH is used to transmit the related control information for controlling a UE receiving HS-PDSCH channel, HS-SICH is used for transmitting the feedback information of a UE receiving HS-PDSCH channel in uplink direction. The MAC-hs entity performs the assignment of the HS-PDSCH physical channel using the HS-SCCH and HS-SICH physical channels. The three physical channels, i.e., HS-PDSCH, HS-SCCH, and HS-SICH, construct a closed loop of the physical layer, the channels perform processes and transport in unit of TTI of 5 ms.

While the system assigns HSDPA related resources for a UE, associated dedicated channels are also required to assign for the UE, including transport channels (DCH) and physical channels (DPCH), for carrying the related Radio Resource Controller (RRC for short) signaling.

The transmitting of the uplink channel needs an uplink synchronization process in TD-SCDMA system. The uplink synchronization process includes an initial synchronization process and a synchronization keeping process. The configuration of synchronous parameters and the process of the synchronous control command (SS) are included in the synchronization keeping process. In the HSDPA protocol criterion of the current 3GPP TD-SCDMA standard, the parameter configuration of the uplink synchronization process for the uplink HS-SICH physical channel and the process of the synchronous control command are not integrated, which represents as no configuration process of the uplink synchronous parameters of the HS-SICH physical channel (including the configurations of Node B and UE), thereby inducing that Node B and the UE can perform no countermeasure upon transmitting and receiving and processing a SS command.

It can be seen from the above that a method of uplink synchronization configuration and process for the high speed shared information channel is needed to enable Node B and UE to transmit and receive the SS processing command.

SUMMARY OF THE INVENTION

The present invention aims to provide an uplink synchronization control method and system for the high speed shared information channel to realize the control of the uplink synchronization process of the HS-SICH physical channel.

According to one aspect of the present invention, an uplink synchronization control method for the high speed shared information channel is provided. The method includes the following steps: S102, a radio network controller assigns resources associated with the high speed downlink packet access for the services to a user equipment and sends the information associated with the resources to Node B and the user equipment; S104, Node B configures uplink synchronization parameters for the high speed shared information channel for the user equipment using the uplink synchronization parameters which are assigned by the radio network controller to the radio link which the high speed shared information channel belongs to; the user equipment configures uplink synchronization parameters for the high speed shared information channel of the user equipment using the uplink synchronization parameters for the uplink associated dedicated physical channel assigned by the radio network controller, wherein the uplink synchronization parameters for the uplink associated dedicated physical channel and the uplink synchronization parameters for the radio link which the high speed shared information channel belongs to are both set to be the same by the radio network controller; and S106, Node B and the user equipment send and/or receive a synchronization control command and control the uplink synchronization process for the high speed shared information channel according to the uplink synchronization parameters for the high speed shared information channel configured for the user equipment respectively.

According to another aspect of the present invention, an uplink synchronization control system 300 for the high speed shared information channel is provided. The system includes: a first synchronization parameter configuring device 302 located at Node B side for configuring the uplink synchronization parameters for the high speed shared information channel for the user equipment using the uplink synchronization parameters assigned by a radio network controller for the radio link which the high speed shared information channel belongs to when the radio network controller assigns the resources associated with the high speed downlink packet access for the services for the user equipment and sends the information associated with the resources to Node B; a second synchronization parameter configuring device 304 located at the user equipment side for configuring the uplink synchronization parameters for the high speed shared information channel for the user equipment using the uplink synchronization parameters for the uplink associated dedicated physical channel assigned by the radio network controller when the radio network controller assigns the resources associated with the high speed downlink packet access for the services for the user equipment, wherein the uplink synchronization parameters for the uplink associated dedicated physical channel and the uplink synchronization parameters for the high speed shared information channel are both set to be the same by the radio network controller; a first uplink synchronization control device 306 located at Node B side for generating and sending an uplink synchronization control command according to the uplink synchronization parameters for the high speed shared information channel assigned for the user equipment to control the uplink synchronization process for the high speed shared information channel; and a second uplink synchronization control device 308 located at the user equipment side for receiving and processing the uplink synchronization control command according to the uplink synchronization parameters for the high speed shared information channel assigned for the user equipment to control the uplink synchronization process for the high speed shared information channel.

According to another aspect of the present invention, an uplink synchronization control method for the high speed shared information channel is provided. The method includes the following steps: S402, a radio network controller sends the message carrying the uplink synchronization parameters for the high speed shared information channel to Node B and a user equipment for Node B and the user equipment configuring the high speed shared information channel with the uplink synchronization parameters for the user equipment when assigning the resources associated with the high speed downlink packet access for the user equipment; S404, Node B and the user equipment obtain the uplink synchronization parameters for the high speed shared information channel from the message and configure the uplink synchronization parameters for the high speed shared information channel respectively; and S406, Node B and the user equipment send and/or receive a synchronization control command and control the uplink synchronization process for the high speed shared information channel according to the uplink synchronization parameters for the high speed shared information channel configured for the user equipment respectively.

According to another aspect of the present invention, an uplink synchronization control system 600 of high speed shared information channel is provided. The system includes: a synchronization parameter message sending device 602 located at a radio network controller side for sending the message carrying uplink synchronization parameters for the high speed shared information channel to Node B and a user equipment for Node B and the user equipment configuring the high speed shared information channel for the user equipment when the radio network controller assigns the resources associated with the high speed downlink packet access for the services of the user equipment; a third synchronization parameter configuring device 604 located at Node B side for obtaining the uplink synchronization parameters for the high speed shared information channel from the message and performing configuration; a fourth synchronization parameter configuring device 606 located at the user equipment side for obtaining the uplink synchronization parameters for the high speed shared information channel from the message and performing configuration; a third uplink synchronization control device 608 located at Node B side for generating and sending an uplink synchronization control command according to the uplink synchronization parameters for the high speed shared information channel to control the uplink synchronization process for the high speed shared information channel; and a fourth uplink synchronization control device 610 located at the user equipment side for receiving and processing the uplink synchronization control command according to the uplink synchronization parameters for the high speed shared information channel to control the uplink synchronization process for the high speed shared information channel.

By the present invention, the control of the uplink synchronization process for the high speed shared information channel physical channel can be realized, and the uplink synchronization parameter configuration process for the high speed shared information channel physical channel can be indicated, therefore Node B and the user equipment can exactly perform the uplink synchronization process for the high speed shared information channel.

BRIEF DESCRIPTION OF THE DRAWINGS

The figures is provided for further understanding the present invention, which constitutes part of the present invention, the schematic embodiments of the present invention and the description thereof are for explaining the present invention rather than improper limit.

EMBODIMENTS OF THE INVENTION

Figure 1:
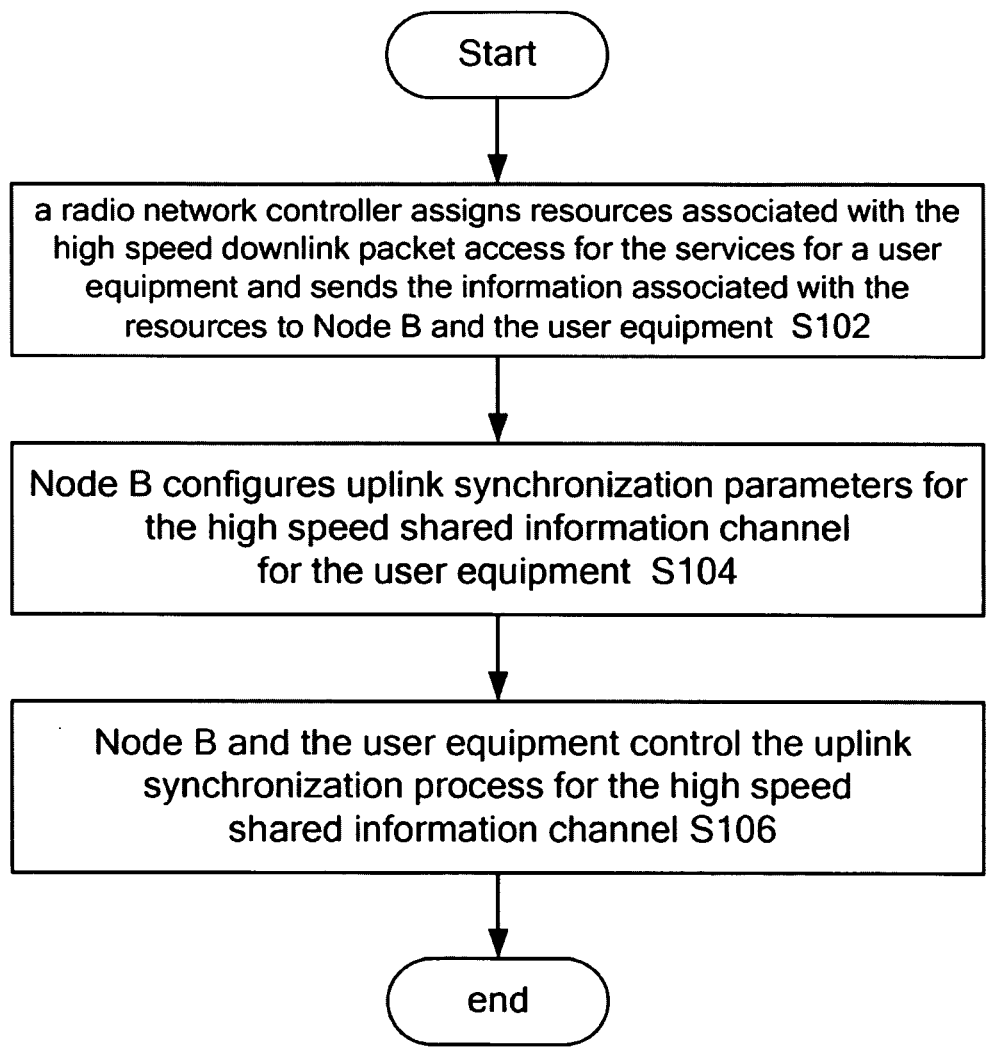
FIG. 1 is a flow chart of an uplink synchronization control method for the high speed shared information channel according to the present invention.
Figure 2:
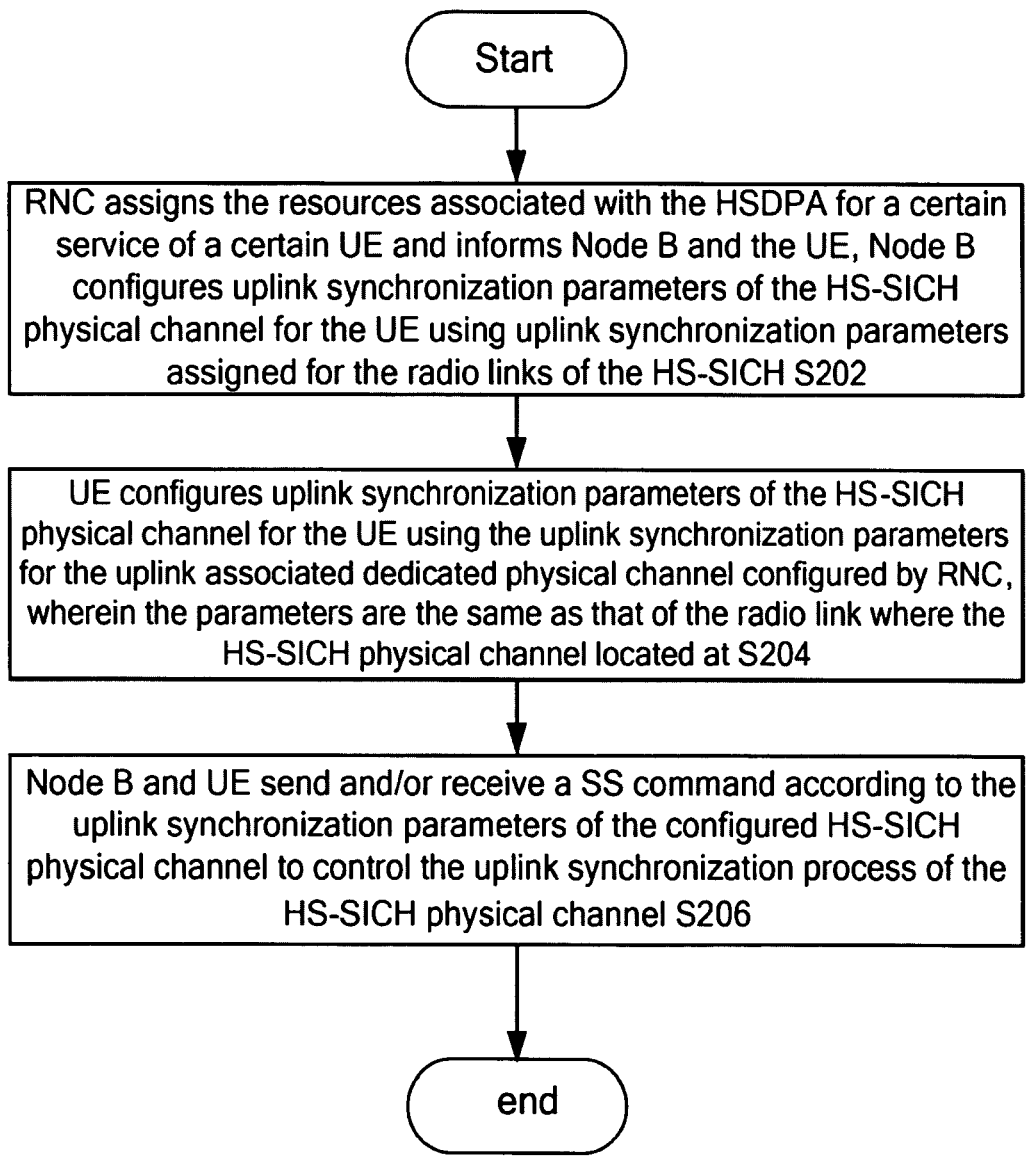
FIG. 2 is a flow chart illustrating one embodiment of the method shown in FIG. 1.
Figure 3:
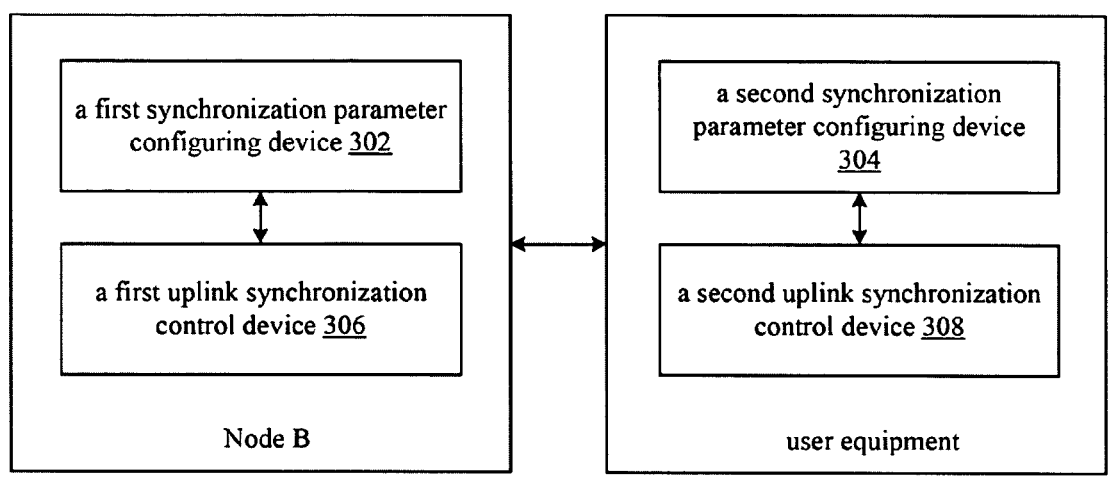
FIG. 3 is a block diagram of an uplink synchronization control system for the high speed shared information channel according to the present invention.

FIG. 1 is a flow chart of an uplink synchronization control method for the high speed shared information channel according to the present invention; FIG. 2 is a flow chart illustrating one embodiment of the method shown in FIG. 1; FIG. 3 is a block diagram of an uplink synchronization control system for the high speed shared information channel according to the present invention.

As shown in FIG. 1, an uplink synchronization control method for the high speed shared information channel according to the present invention includes the following steps: S102, a radio network controller assigns resources associated with the high speed downlink packet access for the services to a user equipment and sends the information associated with the resources to Node B and the user equipment; S104, Node B configures uplink synchronization parameters for the high speed shared information channel for the user equipment using the uplink synchronization parameters which are assigned by the radio network controller to the radio link which the high speed shared information channel belongs to; the user equipment configures the uplink synchronization parameters for the high speed shared information channel for the user equipment using the uplink synchronization parameters for the uplink associated dedicated physical channel assigned by the radio network controller, wherein the uplink synchronization parameters for the uplink associated dedicated physical channel and the uplink synchronization parameters for the high speed shared information channel are set to be the same by the radio network controller; and S106, Node B and the user equipment send and/or receive a synchronization control command and control the uplink synchronization process for the high speed shared information channel according to the uplink synchronization parameters for the high speed shared information channel configured for the user equipment respectively.

Wherein, the radio network controller performs at least one procedure of the followings to send to Node B the corresponding message assigning the resources associated with the high speed downlink packet access for the services for the user equipment for carrying the uplink synchronization parameters for the high speed shared information channel: radio link setup, radio link addition, the synchronized radio link reconfiguration, or the asynchronized radio link reconfiguration procedure initiated by the radio network controller for the user equipment.

Wherein, the information associated with the resources includes the information of the uplink synchronization parameters assigned for the radio link which the high speed shared information channel belongs to and the information of the radio link which indicates the Node B to configure the resources for the high speed shared information channel for the user equipment.

Wherein, the radio network controller performs at least one procedure of the followings to send to the user equipment the corresponding message assigning the resources associated with the high speed downlink packet access for the services for the user equipment for carrying the uplink synchronization parameters for the high speed shared information channel: cell update confirm, handover to UTRAN command, physical channel reconfiguration, radio bearer reconfiguration, radio bearer release, radio bearer setup, radio resource control (RRC) connection setup, or transport channel reconfiguration.

Wherein, the synchronization control command in step S106 is sent and/or received on the high speed shared control channel configured in pair with the high speed shared information channel or on the downlink associated dedicated physical channel.

As shown in FIG. 2, an embodiment of an uplink synchronization control method for the high speed shared information channel according to the present invention will be described in detail. Wherein, for each UE, the uplink synchronization configuration information of the associated dedicated physical channel (DPCH) is used for configuring uplink synchronization parameters of the HS-SICH physical channel, and the uplink synchronization process is performed according to the configuration information, the method includes the following steps:

S202, RNC assigns the resources associated with the HSDPA for a certain service of a certain UE and informs Node B and the UE, Node B configures uplink synchronization parameters of the HS-SICH physical channel for the UE using uplink synchronization parameters assigned for the radio links of the HS-SICH, wherein the uplink synchronization parameters include Uplink Synchronization Step Size and Uplink Synchronization Frequency;

In detail, at network side, for a certain UE, RNC can originate processes of radio link setup, radio link addition, the synchronized radio link reconfiguration, or the asynchronized reconfiguration of the radio link defined in NBAP protocol, and sends a RADIO LINK SETUP REQUEST message, a RADIO LINK ADDITION REQUEST message, a RADIO LINK RECONFIGURATION PREPARE message, and a RADIO LINK RECONFIGURATION REQUEST message to Node B through Iub interface, an uplink synchronization step size and an uplink synchronization frequency for each radio link are configured in the UL Synchronization Parameter LCR information element in the RL Information element of the above messages.

If RNC assigns HSDPA resources for a certain service of the UE when or after performing radio link setup (which can setup DCH channel first, then assigns HSDPA resources), that is by the above process to require Node B to assign HSDPA related resources on a certain radio link, wherein the HSDPA related resources including HS-SICH resources and HS-PDSCH resources, then Node B configures the uplink synchronization parameters of the HS-SICH for the UE using the uplink synchronization parameters configured for the radio link, the parameters are same as the uplink synchronization parameters configured for the HS-PDSCH.

S204, at UE side, UE configures uplink synchronization parameters of the HS-SICH physical channel for the UE using the uplink synchronization parameters for the uplink associated dedicated physical channel configured by RNC, wherein the parameters also including uplink synchronization step size and the uplink synchronization frequency, RNC should ensure that the uplink synchronization parameters configured for the uplink DPCH are the same as that of the radio link where the HS-SICH located;

For a certain UE, RNC can originate processes of cell updating confirmation, handover to UTRAN command, physical channel reconfiguration, radio bearer reconfiguration, radio bearer release, radio bearer setup, RRC connection setup or transport channel reconfiguration defined in RRC protocol, and sends a CELL UPDATE CONFIRM message, a HANDOVER TO UTRAN COMMAND message, a PHYSICAL CHANNEL RECONFIGURATION message, a RADIO BEARER RECONFIGURATION message, RADIO BEARER RELEASE message, RADIO BEARER SETUP message, RRC CONNECTION SETUP message or TRANSPORT CHANNEL RECONFIGURATION message to the UE through Uu interface. An uplink synchronization step size and an uplink synchronization frequency for the uplink associated dedicated physical channel are configured in the Uplink synchronization parameter information element in the uplink timing advance control information element in the Uplink DPCH information element of the above messages. The above messages correspond to the messages send to Node B by RNC, which can refer to the criterions of the existing protocols.

If RNC configures the HSDPA related resources for the UE in the above messages (except the HANDOVER TO UTRAN COMMAND message), wherein the resources including HS-SICH resources, then the UE configures uplink synchronization parameters of the HS-SICH for the UE using the synchronization parameters of the configured uplink associated dedicated physical channel.

S206, Node B sends a SS command according to the uplink synchronization parameters of the configured HS-SICH physical channel, the UE then receives the SS command and controls the uplink synchronization process of the HS-SICH physical channel according to the uplink synchronization parameters of the HS-SICH physical channel.

Sending and receiving the SS command can be performed on the corresponding HS-SCCH which is configured with the HS-SICH in pair, wherein the SS command message is only for the HS-SICH physical channel. Sending and receiving the SS command can also be performed on the downlink associated DPCH, that is when no corresponding HS-SCCH physical channel has been sent, the SS command message on the downlink associated DPCH is shared with the uplink associated DPCH.

As shown in FIG. 3, an uplink synchronization control system 300 for the high speed shared information channel includes: a first synchronization parameter configuring device 302 located at Node B side for configuring the uplink synchronization parameters for the high speed shared information channel for a user equipment using the uplink synchronization parameters assigned by a radio network controller for the radio link which the high speed shared information channel belongs to when the radio network controller assigns the resources associated with the high speed downlink packet access for the services for the user equipment and sends the information associated with the resources to Node B; a second synchronization parameter configuring device 304 located at the user equipment side for configuring the uplink synchronization parameters for the high speed shared information channel for the user equipment using the uplink synchronization parameters for the uplink associated dedicated physical channel assigned by the radio network controller when the radio network controller assigns the resources associated with the high speed downlink packet access for the services for the user equipment, wherein the uplink synchronization parameters for the uplink associated dedicated physical channel and the uplink synchronization parameters of the radio link for the high speed shared information channel are set to be the same by the radio network controller; a first uplink synchronization control device 306 located at Node B side for generating and sending an uplink synchronization control command according to the uplink synchronization parameters for the high speed shared information channel assigned for the user equipment to control the uplink synchronization process for the high speed shared information channel; and a second uplink synchronization control device 308 located at the user equipment side for receiving and processing the uplink synchronization control command according to the uplink synchronization parameters for the high speed shared information channel assigned for the user equipment to control the uplink synchronization process for the high speed shared information channel.

Wherein the radio network controller performs at least one procedure of the followings to send to Node B the corresponding message assigning the resources associated with the high speed down link packet access for the services for the user equipment for carrying the uplink synchronization parameters for the high speed shared information channel: radio link setup, radio link addition, the synchronized radio link reconfiguration, or asynchronized radio link reconfiguration procedure initiated by the radio controller for the user equipment.

Wherein the information associated with the resources includes uplink synchronization parameter information assigned for the radio link which the high speed shared information channel belongs to and the information of the radio link which indicates the Node B to configure the resources to the high speed shared information channel for the user equipment.

Wherein the radio network controller performs at least one procedure of the followings to send to the user equipment the corresponding message assigning the resources associated with the high speed downlink packet access for the services for the user equipment for carrying the uplink synchronization parameters for the high speed shared information channel: cell update confirm, handover to UTRAN command, physical channel reconfiguration, radio bearer reconfiguration, radio bearer release, radio bearer setup, radio resource control connection setup, or transport channel reconfiguration.

Wherein the first synchronization control device and the second synchronization control device send and/or receive the synchronization control command on the high speed shared control channel configured in pair with the high speed shared information channel or on the downlink associated dedicated physical channel.

Figure 4:
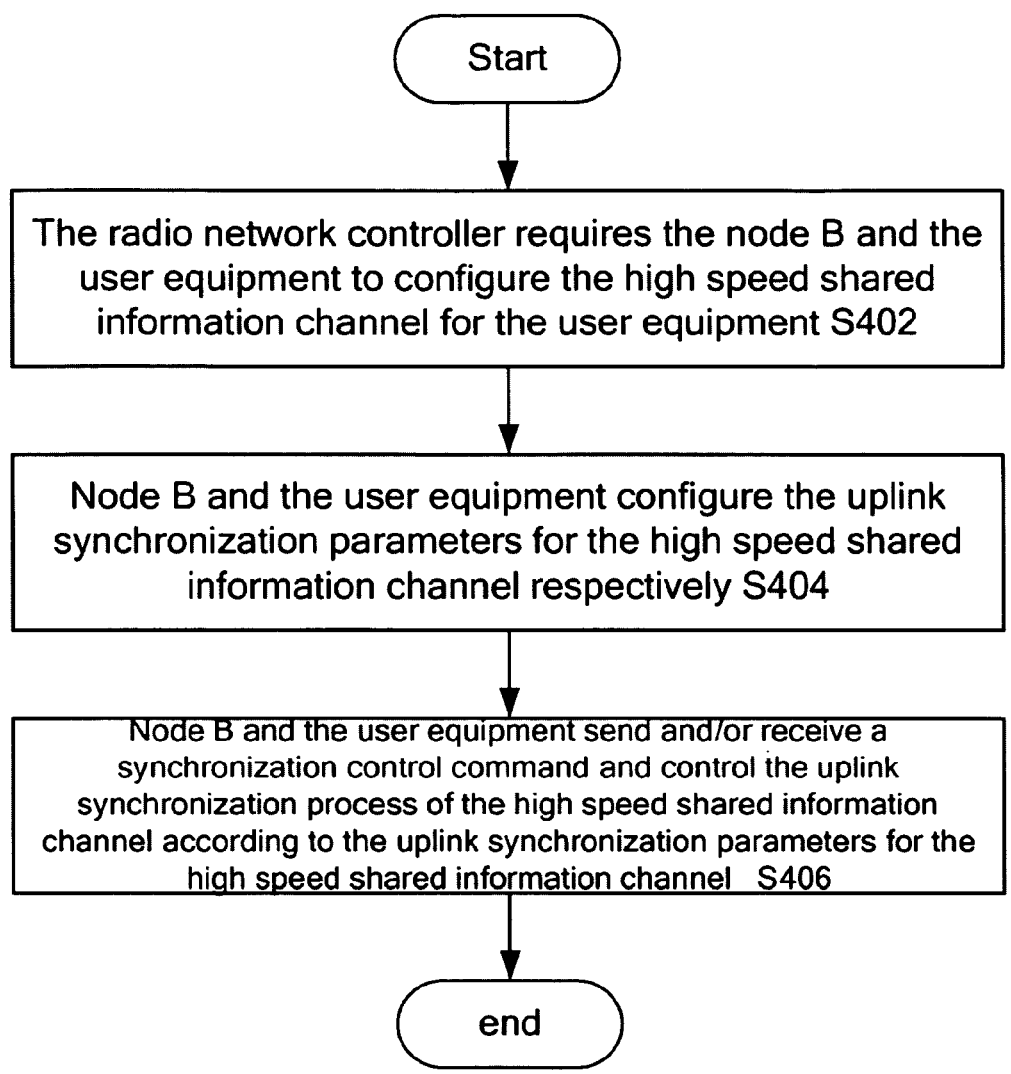
FIG. 4 is a flow chart of another uplink synchronization control method for the high speed shared information channel according to the present invention.
Figure 5:
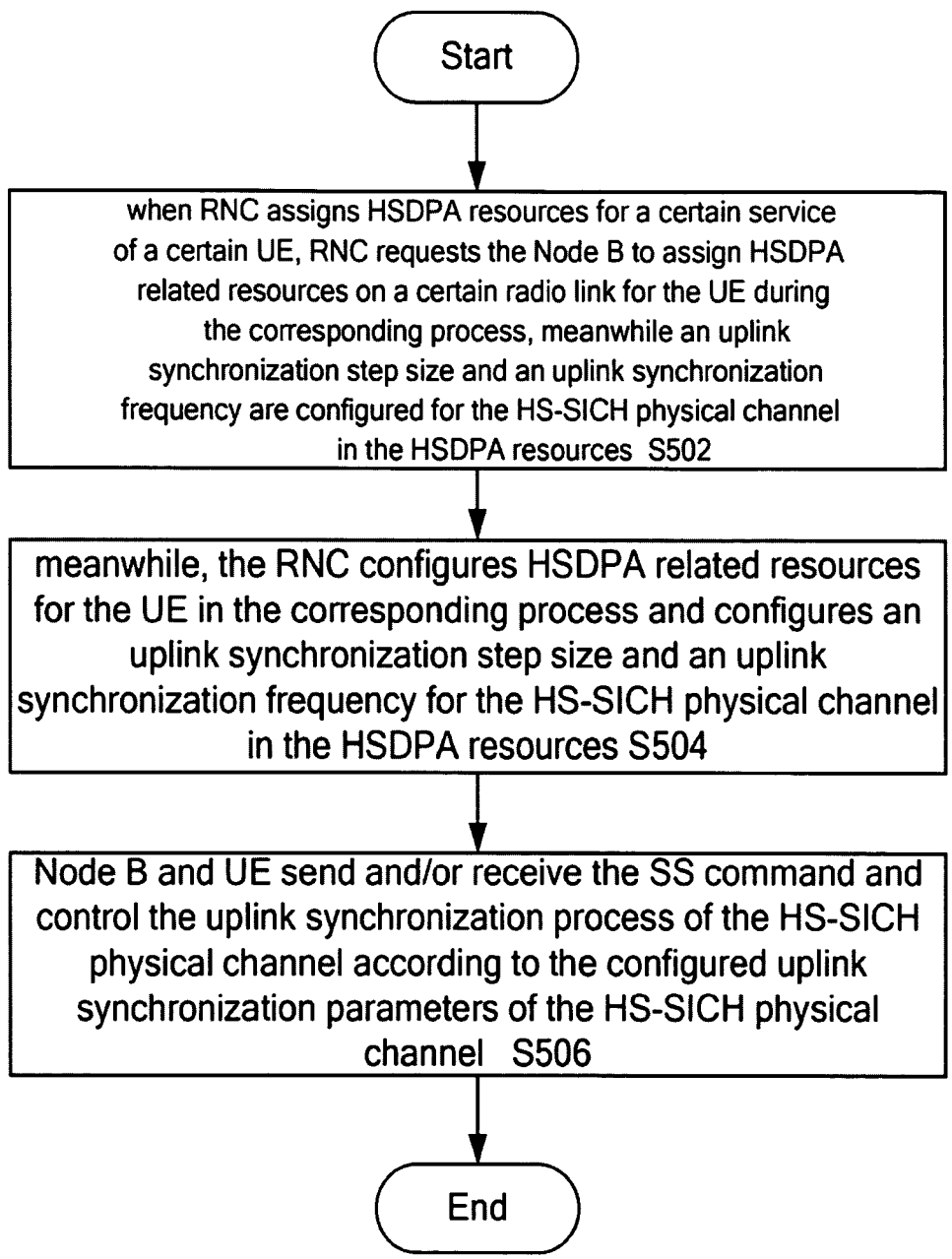
FIG. 5 is a flow chart illustrating one embodiment of the method shown in FIG. 4.
Figure 6:
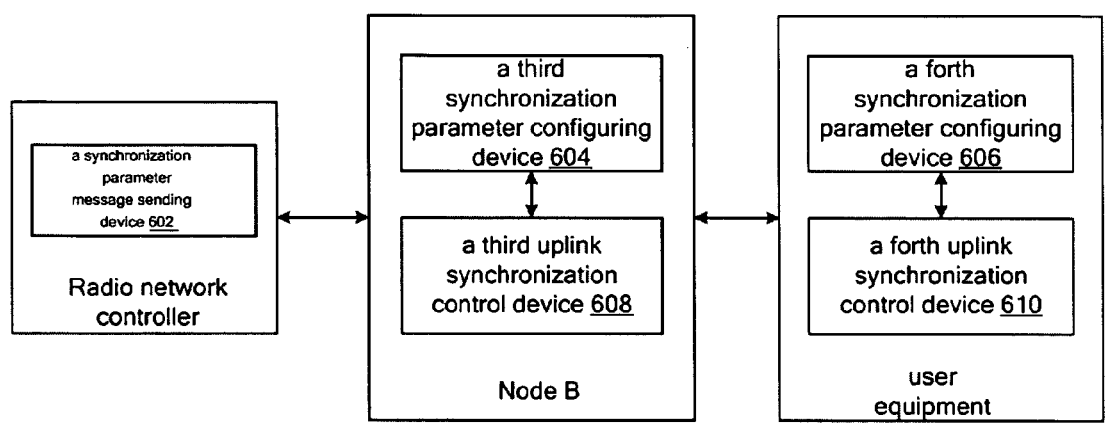
FIG. 6 is a block diagram of another uplink synchronization control system of high speed shared information channel according to the present invention.

FIG. 4 shows another uplink synchronization control method for the high speed shared information channel; FIG. 5 shows one embodiment of the method shown in FIG. 4; and FIG. 6 shows another uplink synchronization control system for the high speed shared information channel.

As shown in FIG. 4, another uplink synchronization control method for the high speed shared information channel includes the followings: S402, a radio network controller sends the message carrying the uplink synchronization parameters configured for the high speed shared information channel to Node B and a user equipment for Node B and the user equipment configuring the high speed shared information channel with the uplink synchronization parameters for the user equipment when assigning the resources associated with the high speed downlink packet access for the user equipment; S404, Node B and the user equipment obtain the uplink synchronization parameters configured for the high speed shared information channel from the message and configure the uplink synchronization parameters for the high speed shared information channel respectively; and S406, Node B and the user equipment send and/or receive a synchronization control command and control the uplink synchronization process for the high speed shared information channel according to the uplink synchronization parameters for the high speed shared information channel configured for the user equipment respectively.

Wherein the radio network controller performs at least one procedure of the followings to send to Node B the corresponding message assigning the resources associated with the high speed downlink packet access for the services for the user equipment for carrying the uplink synchronization parameters for the high speed shared information channel: radio link setup, radio link addition, the synchronized radio link reconfiguration, or the asynchronized radio link reconfiguration procedure initiated by the radio network controller for the user equipment.

Wherein the message carrying the uplink synchronization parameters configured for the high speed shared information channel carries the uplink synchronization parameters configured for the high speed shared information channel within the uplink synchronization parameter information element within the high speed downlink shared channel time division duplex information element thereof.

Wherein the radio network controller performs at least one procedure of the followings to send to the user equipment the corresponding message assigning the resources associated with the high speed downlink packet access for the services for the user equipment for carrying the uplink synchronization parameters for the high speed shared information channel: cell update confirm, physical channel reconfiguration, radio bearer release, radio bearer setup, radio resource control connection setup, or transport channel reconfiguration procedure initiated by the radio network controller for the user equipment.

Wherein the message carrying the uplink synchronization parameters configured for the high speed shared information channel carries the uplink synchronization parameters configured for the high speed shared information channel within the uplink synchronization parameter information element set within the high speed shared control channel information element within the high speed physical downlink shared channel information element thereof.

Wherein in step S406, the synchronization control command is sent and/or received on the high speed shared control channel configured in pair with the high speed shared information channel or on the downlink associated dedicated physical channel.

Wherein if the synchronization control command is sent and/or received on the downlink associated dedicated physical channel, Node B and user equipment shall control the uplink synchronization process for the high speed shared information channel with the consideration of the difference between the uplink synchronization parameters configured for the high speed shared information channel and the uplink associated dedicated physical channel.

In detail, as shown in FIG. 5, another embodiment of the uplink synchronization control method for the high speed shared information channel. Wherein, for each UE, RNC configures the uplink synchronization information of the HS-SICH, Node B and the UE perform the uplink synchronization process of the HS-SICH according to the configured information, and the method includes the following steps:

S502, when RNC assigns HSDPA resources for a certain service of a certain UE, RNC requests Node B to assign HSDPA related resources on a certain radio link for the UE during the processes of radio link setup, radio link addition, synchronization reconfiguration of the radio link or asynchronization reconfiguration of the radio link, wherein the resources including HS-SICH resources, meanwhile an uplink synchronization step size and an uplink synchronization frequency are configured for the HS-SICH physical channel in the HSDPA resources; in the above processes, RNC respectively sends a RADIO LINK SETUP REQUEST message, a RADIO LINK ADDITION REQUEST message, a RADIO LINK RECONFIGURATION PREPARE message, or a RADIO LINK RECONFIGURATION REQUEST message through Iub interface. An uplink synchronization parameter information element is added into the HS-DSCH TDD information element of these messages, and uplink synchronization parameters for the HS-SICH physical channel are configured. Node B obtains the uplink synchronization parameters of the UE from the uplink synchronization parameter information element.

S504, meanwhile, the RNC configures HSDPA related resources for the UE in the processes of cell updating confirmation, physical channel reconfiguration, radio bearer reconfiguration, radio bearer releasing, radio bearer setup, RRC connection setup, or transport channel reconfiguration, wherein the resources including HS-SICH resources, meanwhile configures an uplink synchronization step size and an uplink synchronization frequency for the HS-SICH physical channel in the HSDPA resources;

In the above processes, RNC respectively send a CELL UPDATE CONFIRM message, a PHYSICAL CHANNEL RECONFIGURATION message, a RADIO BEARER RECONFIGURATION message, a RADIO BEARER RELEASE message, a RADIO BEARER SETUP message, a RRC CONNECTION SETUP message, a TRANSPORT CHANNEL RECONFIGURATION message to the UE through Uu interface. For TD-SCDMA system, an uplink synchronization parameter information element can be added into the HS-SCCH information element in the downlink HS-PDSCH information element of these messages, and uplink synchronization parameters of the HS-SICH physical channel are configured. The UE obtains the uplink synchronization parameters of the HS-SICH of the UE from the information element.

S506, Node B configures uplink synchronization parameters of the HS-SICH of the UE according to the obtained uplink synchronization parameters, and sends a SS command according to the parameters, the UE configures uplink synchronization parameters of the HS-SICH of the UE according to the obtained uplink synchronization parameters, and receives the SS command and controls the uplink synchronization process of the HS-SICH physical channel according the parameters.

Sending and receiving the SS command can be performed on the corresponding HS-SCCH which is configured in pair with the HS-SICH, the SS command message is only for the HS-SICH physical channel. Sending and receiving the SS command can also be performed on the downlink associated DPCH, that is the SS command message on the downlink associated DPCH is shared with the uplink associated DPCH when no corresponding HS-SCCH physical channel has been sent, but here the difference between HS-SICH and the uplink synchronization parameters configured for the uplink associated DPCH, that is the difference between the uplink synchronization parameters in the RL information element and that configured in the above information element should be considered to control the adjustments result of the uplink synchronization process of the HS-SICH.

As shown in FIG. 6, another uplink synchronization control system 600 for the high speed shared information channel according to the present invention includes: a synchronization parameter message sending device 602 located at a radio network controller side for sending the message carrying uplink synchronization parameters configured for the high speed shared information channel to Node B and a user equipment for Node B and the user equipment configuring the high speed shared information channel for the user equipment when the radio network controller assigns the resources associated with the high speed downlink packet access for the services of the user equipment; a third synchronization parameter configuring device 604 located at Node B side for obtaining the uplink synchronization parameters configured for the high speed shared information channel from the message, and performing configuration; a fourth synchronization parameter configuring device 606 located at the user equipment side for obtaining the uplink synchronization parameters configured for the high speed shared information channel from the message, and performing configuration; a third uplink synchronization control device 608 located at Node B side for generating and sending an uplink synchronization control command according to the uplink synchronization parameters for the high speed shared information channel to control the process of uplink synchronization for the high speed shared information channel; and a fourth uplink synchronization control device 610 located at the user equipment side for receiving and processing the uplink synchronization control command according to the uplink synchronization parameters for the high speed shared information channel to control the process of uplink synchronization for the high speed shared information channel.

Wherein the synchronization parameter message sending device sends the message carrying the uplink synchronization parameters for the high speed shared information channel to Node B when the radio network controller performs at least one procedure of the followings to assign the resources associated with the high speed downlink packet access for the services of the user equipment: radio link setup, radio link addition, the synchronized radio link reconfiguration, or the asynchronized radio link reconfiguration procedure initiated by the radio network controller for the user equipment.

Wherein the message carrying the uplink synchronization parameters configured for the high speed shared information channel carries the uplink synchronization parameters configured for the high speed shared information channel within the uplink synchronization parameter information element within the high speed downlink shared channel time division duplex information element thereof.

Wherein the synchronization parameter message sending device sends the message carrying the uplink synchronization parameters for the high speed shared information channel to user equipment when the radio network controller performs at least one procedure of the followings to assign the resources associated with the high speed downlink packet access for the services for the user equipment: cell update confirm, physical channel reconfiguration, radio bearer reconfiguration, radio bearer release, radio bearer setup, radio resource control connection setup, or transport channel reconfiguration procedure initiated by the radio network controller for the user equipment.

Wherein the message carrying the uplink synchronization parameters configured for the high speed shared information channel carries the uplink synchronization parameters configured for the high speed shared information channel within the uplink synchronization parameter information element set within the high speed shared control channel information element within the high speed physical downlink shared channel information element thereof.

Wherein in the third and fourth uplink synchronization device, the synchronization control command is sent and/or received on the high speed shared control channel configured in pair with the high speed shared information channel or on the downlink associated dedicated physical channel.

Wherein if the synchronization control command is send and/or received on the downlink associated dedicated physical channel, the third uplink synchronization device and the fourth uplink synchronization device shall control the process for uplink synchronization for the high speed shared information channel with the consideration of the difference between the uplink synchronization parameters configured for the high speed shared information channel and the uplink associated dedicated physical channel.

By the present invention, the control of the uplink synchronization process for the high speed shared information channel physical channel can be realized, and the configuration process of the uplink synchronization parameters for the high speed shared information channel physical channel can be presented, so that Node B and the user equipment can accurately perform the uplink synchronization process for the high speed shared information channel.

The above are only the embodiments of the present invention and do not limit the present invention, for those skilled in the art, there can be various modifications and changes of the present invention. Any modification, equivalent, and improvement within the scope and spirit of the invention should be included in the protection scope of the present invention.

What is claimed is:

1. An uplink synchronization control method for a high speed shared information channel including:

a radio network controller assigns resources associated with a high speed downlink packet access for services for a user equipment and sends information associated with the resources to a Node B and the user equipment;

the Node B configures uplink synchronization parameters for the high speed shared information channel for the user equipment using the uplink synchronization parameters which are assigned by the radio network controller to a radio link, which the high speed shared information channel belongs to; the user equipment configures the uplink synchronization parameters for the high speed shared reformation channel of the user equipment using the uplink synchronization parameters for an uplink associated dedicated physical channel assigned by the radio network controller, wherein the uplink synchronization parameters for the uplink associated dedicated physical channel and the uplink synchronization parameters for the radio link which the high speed shared information channel belongs to are both set to be equal by the radio network controller; and the Node B and the user equipment send and/or receive a synchronization control command and control an uplink synchronization process for the high speed shared information channel according to the uplink synchronization parameters for the high speed shared information channel configured for the user equipment respectively.

2. The uplink synchronization control method for the high speed shared information channel according to claim 1, characterized in that the radio network controller performs at least one procedure to send to the Node B a corresponding message assigning the resources associated with the high speed downlink packet access for the services for the user equipment for carrying the uplink synchronization parameters for the high speed shared information channel, the at least one procedure selected from a group comprising: radio link setup, radio link addition, synchronized radio link reconfiguration or an asynchronized radio link reconfiguration procedure initiated by the radio network controller for the user equipment.

3. The uplink synchronization control method for the high speed, shared information channel according to claim 2, characterized in that the information associated with the resources includes information of the uplink synchronization parameters for the radio link which the high speed shared information channel belongs to and information of the radio link which indicates the Node B to configure the resources for the high speed shared information channel for the user equipment.

4. The uplink synchronization control method for the high speed, shared information channel according to claim 1, characterized in that the radio network controller performs at least one procedure to send to the user equipment a corresponding message assigning the resources associated with the high speed downlink packet access for the services for the user equipment for carrying the uplink synchronization parameters for the high speed shared information channel, the at least one procedure selected from a group comprising: cell update confirm, handover to UTRAN command, physical channel reconfiguration, radio bearer reconfiguration, radio bearer release, radio bearer setup, radio resource control (RRC) connection setup, or transport channel reconfiguration.

5. The uplink synchronization control method for the high speed shared information channel according to claim 1, characterized in that the synchronization control command is sent and/or received on a high speed shared control channel configured in pair with the high speed shared information channel or on a downlink associated dedicated physical channel.

6. An uplink synchronization control system for a high speed shared information channel, including:
- a first synchronization parameter configuring device located at a Node B side for configuring uplink synchronization parameters for the high speed shared information channel for a user equipment using the uplink synchronization parameters assigned by a radio network controller for a radio link which the high speed shared information channel belongs to when the radio network controller assigns resources associated with high speed downlink packet access for services the user equipment and sends information associated with the resources to a Node B;
- a second synchronization parameter configuring device located at a user equipment side for configuring the uplink synchronization parameters for the high speed shared information channel for the user equipment using the uplink synchronization parameters for an uplink associated dedicated physical channel assigned by the radio network controller when the radio network controller assigns the resources associated with the high speed downlink packet access for the services for the user equipment and sends the information associated with the resources to the Node B, wherein the uplink synchronization parameters for the uplink associated dedicated physical channel and the uplink synchronization parameter for the high speed shared information channel are both set to be equal by the radio network controller;
- a first uplink synchronization control device located at the Node B side for generating and sending an uplink synchronization control command according to the uplink synchronization parameters for the high speed shared information channel assigned for the user equipment to control an uplink synchronization process for the high speed shared information channel; and
- a second uplink synchronization control device located at the user equipment side for receiving and processing the uplink synchronization control command according to the uplink synchronization parameters for the high speed shared information channel assigned for the user equipment to control the uplink synchronization process for the high speed shared information channel.

7. The uplink synchronization control system for the high speed shared information channel according to claim 6, characterized in that the radio network controller performs at least one procedure to send to the Node B a corresponding message assigning the resources associated with the high speed downlink packet access for the services for the user equipment for carrying the uplink synchronization parameters for the high speed shared information channel, the at least one procedure selected from a group comprising: radio link setup, radio link addition, synchronized radio link reconfiguration, or asynchronized radio link reconfiguration procedure initiated by the radio network controller for the user equipment.

8. The uplink synchronization control system, for the high speed shared information channel according to claim 7, characterized in that the information associated with the resources includes information of the uplink synchronization parameters assigned for the radio link which the high speed shared information channel belongs to and information of the radio link which indicates the Node B to configure the resources to the high speed shared information channel for the user equipment.

9. The uplink synchronization control system for the high speed shared information channels according to claim 6, characterized in that the radio network controller performs at least one procedure to send to the user equipment a corresponding message assigning the resources associated with the high speed downlink packet access for the services for the user equipment for carrying the: uplink synchronization parameters for the high speed shared information channel, the at least one procedure selected from a group comprising: cell update confirm, handover to UTRAN command, physical channel reconfiguration, radio bearer reconfiguration, radio bearer release, radio bearer setup, radio resource control (RRC) connection setup, or transport channel reconfiguration.

10. The uplink synchronization control system for the high speed shared information channel according to claim 6, characterized in that the first uplink synchronization control device sends and/or receives the uplink synchronization control command on a high speed shared control channel configured in pair with the high speed shared information channel or on a downlink associated dedicated physical channel.

11. The uplink synchronization control system for the high speed shared information channels according to claim 6, characterized in that the second uplink synchronization control device sends and/or receives the uplink synchronization control.

* * * * *